United States Patent

[11] 3,590,591

| [72] | Inventor | Jean Genoud |
| | | Saint-Cyr-Au-Mont d'OR, France |
| [21] | Appl. No. | 12,165 |
| [22] | Filed | Feb. 18, 1970 |
| [45] | Patented | July 6, 1971 |
| [73] | Assignee | Etablissements Genoud & Cie. |
| | | Venissieux, Rhone, France |
| [32] | Priority | Mar. 5, 1969 |
| [33] | | France |
| [31] | | 6906005 |

[54] EXPANSION VALVE UNIT FOR A GAS CIGARETTE LIGHTER
9 Claims, 6 Drawing Figs.

[52] U.S. Cl. .................................................. 62/50, 431/150, 431/344, 251/118
[51] Int. Cl. ........................................................... F17c 7/02
[50] Field of Search ............................................. 431/131, 150, 344; 62/50, 52; 251/118

[56] References Cited
UNITED STATES PATENTS
3,154,935  11/1964  Ayres ........................... 431/344

*Primary Examiner*—Carroll B. Dority, Jr.
*Attorney*—Waters, Roditi, Schwartz and Nissen

ABSTRACT: An expansion valve unit of a gas cigarette lighter has a one-piece injection-moulded plastics housing including exteriorly a flexible annular lip bearing sealingly against a smooth annular wall of a hole in the main body of the lighter. The housing includes interiorly another annular lip forming a valve seat cooperating with a valve closure member of the unit. Also included in the housing exteriorly is an external screw thread cooperating with an internal screw thread of the hole, and radially outward projections enabling the unit to be rotated and thus displaced along the hole to regulate a throttle at the inner end of the unit to control the rate of fuel supply to the seat.

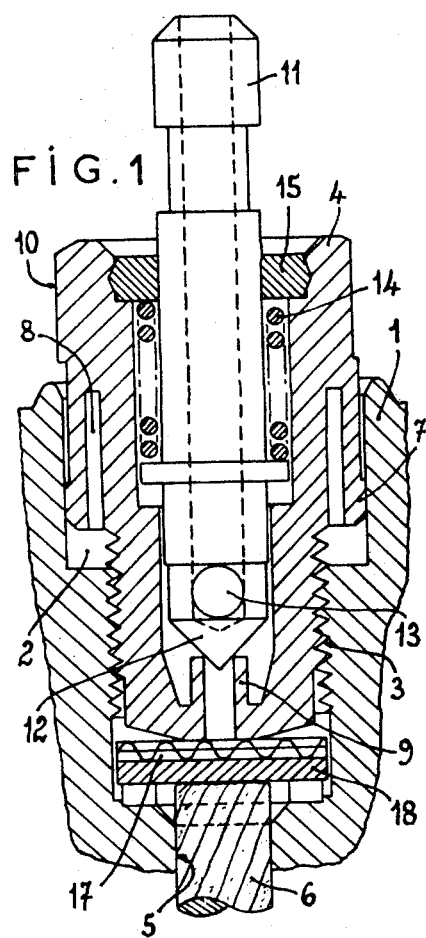
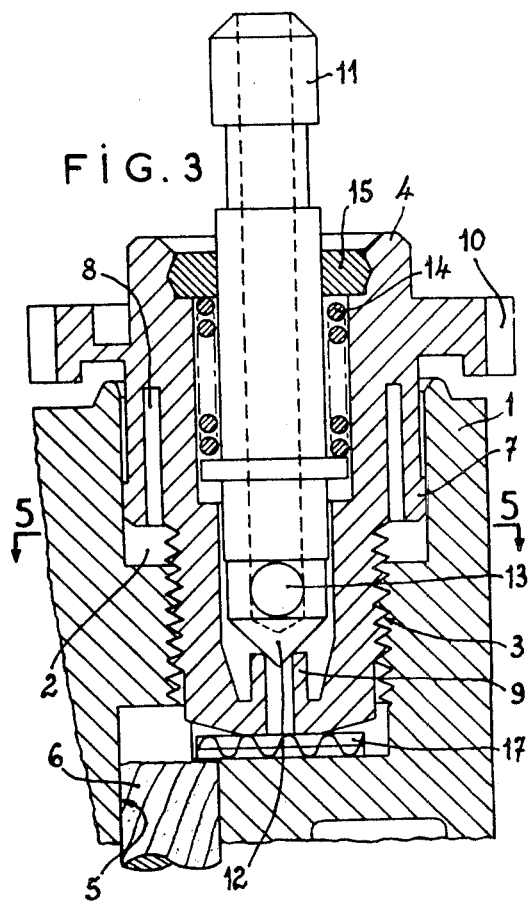
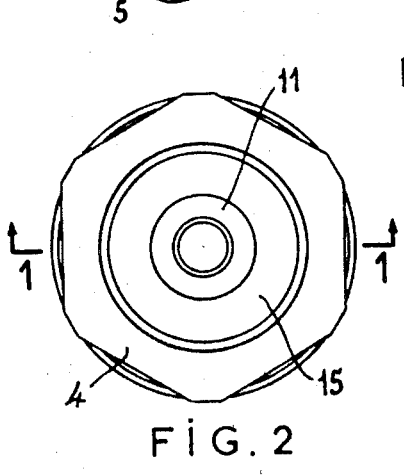
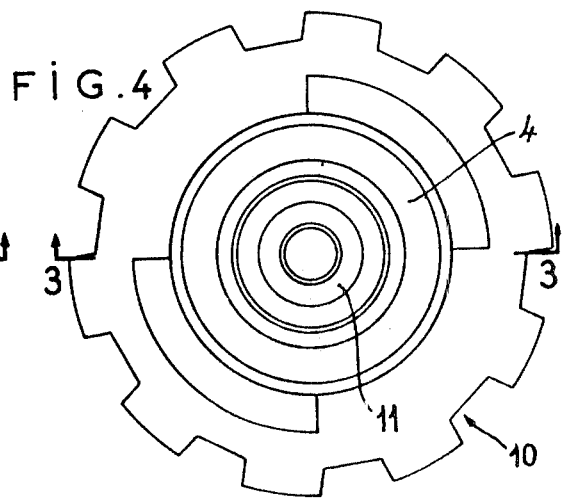

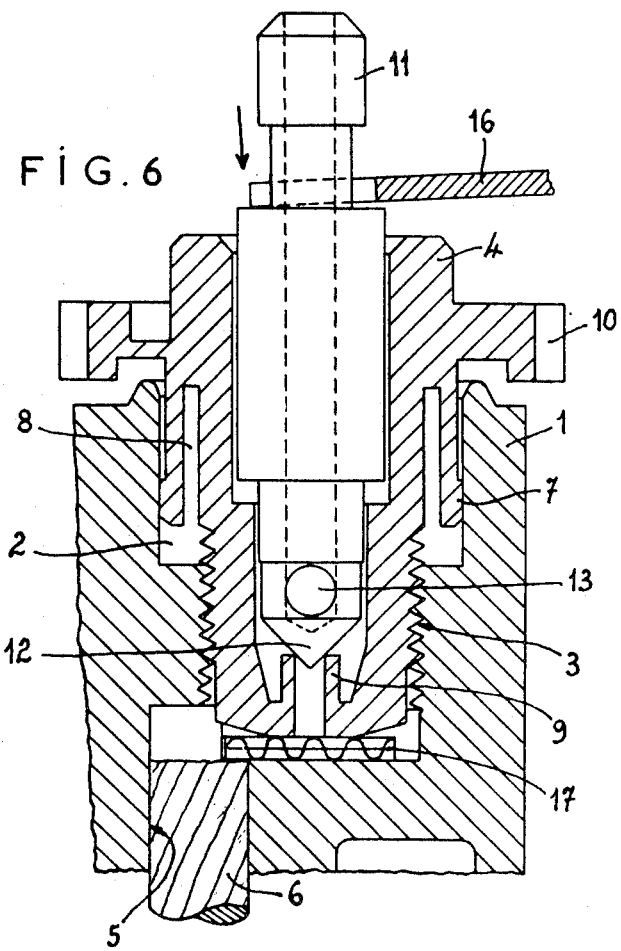
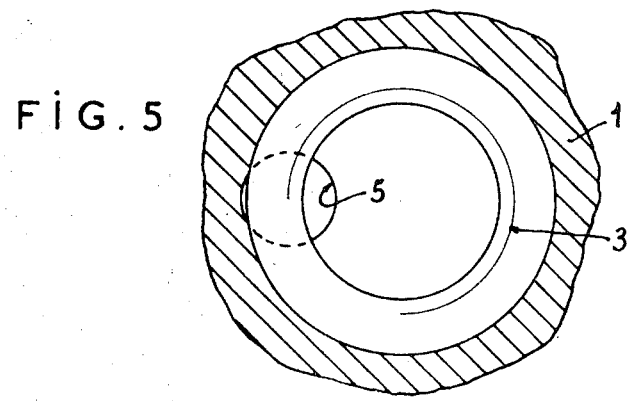

3,590,591

EXPANSION VALVE UNIT FOR A GAS CIGARETTE LIGHTER

BACKGROUND OF THE INVENTION

1. Field of the Invention

This invention relates to an expansion valve unit for a gas cigarette lighter.

2. Description of the Prior Art

Known expansion valve units for gas cigarette lighters each comprise numerous individual parts, including particularly several sealing joints and threaded metal elements, and are relatively expensive to produce, because of the time necessary for assembly of these parts, which are of very small dimensions. This high cost of the valve units is particularly unwelcome in the case of cheap lighters, such as those of the "disposable" type, that is to say those which are thrown away after the fuel stored therein has become exhausted.

SUMMARY OF THE INVENTION

According to the present invention, there is provided an expansion valve unit for a gas cigarette lighter comprising a moulded valve housing of plastics material, a flexible annular lip constituting part of the outside of said housing and formed of said material for bearing in a sealing manner against an annular wall of a hole in a main body of said lighter, another annular lip of smaller diameter than said flexible annular lip and formed of said material, said other annular lip constituting part of the inside of said housing and forming a valve seat, a valve closure member mounted in said housing so as to displaceable between a closed position in which it contacts said valve seat and an open position, and means for mounting said unit in said hole.

By means of the invention, it is possible to provide the main parts of expansion valve units without any subsequent finishing or working being required, and to assemble them with the secondary parts without any intermediate assembly operations being required.

Preferably, there is moulded integrally with the valve housing an external screw thread which cooperates with an internal screw thread of the hole for the unit to be screwed into the hole, and also radially outward projections enabling the unit to be rotated and thus displaced along the hole, whereby the height of the flame can be regulated.

It is also to be noted that the hole into which the unit is screwed, and its internal thread, can also be directly formed by the moulding of the main body itself.

In one embodiment of the lighter, the fuel in its liquid phase is brought to the inner end of the unit by a supply wick disposed in a bore coaxial with the hole and opening into the inner end of the hole in the main body, this necessitating the presence of a metal supporting washer prevent the inner end of the unit from forcing into the bore flexible washers which are compressed by the unit to give adjustment of the fuel flow rate and thus the height of the flame.

In another embodiment, this bore is offset laterally relatively to the longitudinal centerline of the hole, so that the metal washer can be omitted, thereby simplifying manufacture and thus making it more economical.

BRIEF DESCRIPTION OF THE DRAWINGS

In order that the invention may be more clearly understood and readily carried into effect, reference will now be made, by way of example, to the accompanying drawings, in which:

FIG. 1 is a fragmentary axial section, taken along the line 1—1 of FIG. 2, through a first embodiment of the invention, FIG. 2 is a plan view of the first embodiment, FIG. 3 is a fragmentary axial section taken along the line 3—3 of FIG. 4, through a second embodiment of the invention.

FIG. 4 is a plan view of this this second embodiment,

FIG. 5 is a section taken along line 5—5 of FIG. 3, and

FIG. 6 is a fragmentary axial section through a third embodiment of the invention.

DESCRIPTION OF THE PREFERRED EMBODIMENTS.

Referring to FIGS. 1 and 2, a fragmentarily shown main body 1 of a gas cigarette lighter is made by injection-moulding of plastics material. Formed in the body by the moulding of the body is a cylindrical hole 2 with an internal screw thread 3 for receiving an expansion valve unit, and a bore 5 coaxial with the hole 2 for receiving a fuel supply wick 6.

The expansion valve unit includes a valve housing 4 which is also made by injection-moulding of plastics material. Formed as integral parts of the housing by the moulding thereof are two flexible annular lips 7 and 9, radially outward projections 10 and an external screw thread. The lip 7 is in the form of an annular skirt of which the free end bears sealingly against a smooth annular wall of the hole 2 and is disposed nearer to the inner end of the unit and to the screw thread 3 than is the other end of the skirt, an annular chamber 8 being outwardly bounded by the skirt. The lip 9 is of much smaller diameter than the lip 7 and forms a valve seat cooperating with a valve closure member 11 movable between a closed position in which it contacts the lip 7 and an open position. The projections 10 provide an angular profile 10 which has fitted thereon an annular hand grip (not shown) which projects outwardly for enabling the unit to be rotated to control the rate of gas flow and thus the height of the flame. The internal screw thread cooperates with the screw thread 3 so that rotation of the unit displaces the unit along the hole 2. The lip 7 is disposed to the opposite side of the screw threads from the inner end of the hole 2.

It is readily seen that, because of its flexibility, the lip 7 ensures the sealing of the housing 4 relatively to the smooth annular wall of the hole 2 and that this is improved by the action of any gas which escapes past the screw thread 3, since this builds up pressure in the annular chamber 8 and thus tends to expand the lip 7 and press it against the smooth annular wall of the hole.

In the embodiments of FIGS. 3 to 6, the projections 10 are again moulded as part of the vale housing 4, but themselves form the hand grip for rotation to give the regulation of the flame.

In all of the embodiments, the member 11 consists of a necked hollow metal rod. It comprises a conical head 12 for bearing on the seat formed by the lip 9 and has openings 14 for leading gas to its hollow interior, the flame bed formed at the open top of the member 11.

In the embodiments shown in FIGS. 1 to 5, the valve closure member 11 bears on its seat under the action of a spring 14 incorporated in the unit and retained beneath a washer 15 fitted into a groove in the valve housing 4.

However, in the embodiment shown in FIG. 6, the closing spring of the member 11 is disposed externally of the unit and acts by way of a control lever 16. Alternatively, this lever 16 could function as the closing spring.

The throttling of the gas causing its expansion is obtained in the conventional way by washers 17 of compressible material clamped in the base of the hole 2 by the inner end of the unit, the degree of throttling being adjustable by rotation of the unit in the hole 2, as already mentioned.

As regards the embodiment shown in FIGS. 1 and 2, the bore 5 in the body 1 is disposed in the conventional way coaxially with the hole 2 and the unit, and there is provided beneath the washers 17 a rigid metal washer 18 which prevents the washers 17 from being forced into the bore 5 when the unit is screwed into the hole 2.

But in the embodiments shown in FIGS. 3 to 5, the bore 5 is offset laterally with respect to the longitudinal axis of the hole 2, so that the compressible washers 17 may be directly supported by the solid base of the hole 2, thus avoiding the need to provide the metal washer 18.

I claim:

1. An expansion valve unit for a gas cigarette lighter comprising a moulded valve housing of plastics material, a flexible annular lip constituting part of the outside of said housing and formed of said material for bearing in a sealing manner against an annular wall of a hole in a main body of said lighter, another lip of smaller diameter than said flexible annular lip and formed of said material, said other annular lip constituting part of the inside of said housing and forming a valve seat, a valve closure member mounted in said housing so as to be displaceable between a closed position in which it contacts aid valve seat and an open position, and means for mounting said unit in said hole.

2. An expansion valve unit according to claim 1, wherein said means comprises an external screw thread constituting another part of the outside of said housing and formed of said material for cooperating with an internal screw thread of said hole, said unit further comprising radially outwardly projecting portions of the outside of said housing for use in rotating said unit to adjust said unit along said hole.

3. An expansion valve unit according to claim 2, wherein said flexible annular lip, said other annular lip, said external screw thread and said radially outwardly projecting portions have been formed by the moulding of said housing.

4. An expansion valve unit according to claim 1, wherein said flexible annular lip is in the form of an annular skirt having its free end nearer than its other end of one end of the unit.

5. In combination, a moulded plastics main body of a gas cigarette lighter, portions of said main body defining a hole moulded therein and having an annular wall and an internal screw thread and an expansion valve unit mounted in said hole and comprising a moulded plastics valve housing, a flexible annular plastics lip constituting part of the outside of said housing and bearing in a sealing manner against said annular wall, another annular plastics lip of smaller diameter than said flexible annular lip and constituting part of the inside of said housing and forming a valve seat, a valve closure member mounted in said housing so as to be displaceable between a closed position in which it cooperates with said valve seat and an open position, a plastics external screw thread constituting another part of the outside of said housing and cooperating with said internal screw thread, whereby rotation of said unit produces displacement of said unit along said hole, means controlling the rate of supply of fuel to said valve seat and regulatable by displacement of said unit along said hole, and plastics radially outwardly projecting portions of the outside of said housing for use in rotating said unit.

6. A combination according to claim 5, wherein said flexible annular plastics lip, said other annular plastics lip, said external screw thread and said radially outwardly projecting portions have been formed by the moulding of said housing.

7. A combination according to claim 5, and further comprising a fuel supply wick, and other portions of said body defining a bore therein receiving said wick and leading to the inner end of said hole and offset laterally with respect to the longitudinal centerline of said hole.

8. A combination according to claim 5, wherein said flexible annular lip is in the form of an annular skirt having its free end nearer than its other end to the inner end of said hole.

9. A combination according to claim 8, wherein said flexible annular lip is disposed to the opposite side of the screw threads from said inner end of said hole.